(12) United States Patent
Chawda et al.

(10) Patent No.: US 10,769,328 B2
(45) Date of Patent: Sep. 8, 2020

(54) GENERATING A TEMPLATE-DRIVEN SCHEMATIC FROM A NETLIST OF ELECTRONIC CIRCUITS

(71) Applicant: TEXAS INSTRUMENTS INCORPORATED, Dallas, TX (US)

(72) Inventors: Pradeep Kumar Chawda, Cupertino, CA (US); Makram Monzer Mansour, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 60 days.

(21) Appl. No.: 16/146,008

(22) Filed: Sep. 28, 2018

(65) Prior Publication Data
US 2019/0102489 A1      Apr. 4, 2019

Related U.S. Application Data

(60) Provisional application No. 62/611,958, filed on Dec. 29, 2017, provisional application No. 62/566,336, filed on Sep. 30, 2017.

(51) Int. Cl.
| | |
|---|---|
| *G06F 17/50* | (2006.01) |
| *G06F 30/327* | (2020.01) |
| *G06F 30/33* | (2020.01) |
| *G06F 30/392* | (2020.01) |
| *G06F 30/394* | (2020.01) |
| *G06F 111/12* | (2020.01) |

(52) U.S. Cl.
CPC ............ *G06F 30/327* (2020.01); *G06F 30/33* (2020.01); *G06F 30/392* (2020.01); *G06F 30/394* (2020.01); *G06F 2111/12* (2020.01)

(58) Field of Classification Search
CPC ...... G06F 30/327; G06F 30/33; G06F 30/392; G06F 30/394; G06F 2111/12
USPC .......................................................... 716/102
See application file for complete search history.

(56) References Cited

U.S. PATENT DOCUMENTS 6,684,372 B2 *   1/2004  Tom ........................ G06F 30/30
                                                                         716/103

OTHER PUBLICATIONS

"WEBENCH® Altium® Connector". Dec. 19, 2015 from https://web.archive.org/web/20151219195407/http://www.ti.com/lsds/ti/analog/webench/altiumconnector.page.*
"WEBENCH® Altium Connector User's Manual", SZZU007A Version: 1.1, Apr. 7, 2014.*

\* cited by examiner

*Primary Examiner* — Jack Chiang
*Assistant Examiner* — Brandon Bowers
(74) *Attorney, Agent, or Firm* — Ebby Abraham; Charles A. Brill; Frank D. Cimino

(57) ABSTRACT

Generating a template-driven schematic from a netlist of electronic circuits is disclosed. The template-driven schematic may be useful to generate a set of related circuits for a single overall design as well as allow for a common transfer mechanism between different Computer Aided Design (CAD) systems. To assist in portability of designs, a common file format is disclosed based on a structured text file (e.g., XML). Further, in the disclosed approach, it is possible to not only place primitives but create custom symbols as well. In addition, primitives and symbols may be attached to models, simulation settings may be added, and routing of the circuit in a schematic may be completed. Associated devices and methods are disclosed as well.

20 Claims, 6 Drawing Sheets

```xml
<?xml version="1.0" endoding="iso-8859-1"?>
<schematic>
<circuit>
<component type="L1_S1" mirrored=0 typeid="11" orientation="0" position="424,240" >
   <parameter idx="0" name="Inductance" value="lm">
      <detail type="Tolerance parameters">
         <parameter idx ="0" value="5" />
         <parameter idx="1" value="Gaussian" />
      </detail>
      <detail type="Parameter stepping">
         <parameter idx="0" value="0" />
         <parameter idx="1" value="800u" />
         <parameter idx="2" value="1.2m" />
         <parameter idx="3" value="3" />
         <parameter idx="4" value="Linear" />
      </detail>
   </parameter>
   <parameter idx="1" name="RSer" value="0" />
   <parameter idx="2" name="InitDcVoltage" value="Not Used" />
   <parameter idx="3" name="Temperature" value="Relative" />
   <parameter idx="4" name="Temperature_C" value="0" />
   <parameter idx="5" name="LinTempCoeff" value="0" />
   <parameter idx="6" name="QuadTempCoeff" value="0" />
   <parameter idx="7" name="MaxVoltage" value="100" />
   <parameter idx="8" name="MaxRippleCurrent value="1" />
   <parameter idx="9" name="Fault" value="None" />
   <image>
      <label text="L1_S1" position="425,218" textroot="L1_S1" orientation="0" color="4278222976" />
   </image>
</component>
```

FIG. 5

GENERATING A TEMPLATE-DRIVEN SCHEMATIC FROM A NETLIST OF ELECTRONIC CIRCUITS

CROSS REFERENCE TO RELATED APPLICATIONS

This application claims priority to and benefits from both U.S. Provisional Patent Application Ser. Nos. 62/566,336, filed 30 Sep. 2017, and 62/611,958, filed 29 Dec. 2017 having the same title and inventors as the instant non-provisional application, both of which are incorporated herein by reference in its entirety for all applicable purposes.

BACKGROUND

Schematic design is an important part for building any power application. With a number of Computer Aided Design (CAD) tools available in market, engineers have a choice to pick a tool of their convenience. In the process of building the application, designers use variety of components from various vendors. The vendors usually provide ready schematic modules and associated behavioral models for a typical use case of their product. These are usually design files specific to an Electronic Design Automation (EDA) tool, or design information in the datasheet. In such scenarios, engineers have to replicate the schematic and simulation setup in their design environment. This turns out to be a time consuming and error prone task. Electronic Design Interchange Format (EDIF) was developed for exchange of schematic and model data in a vendor neutral format. EDA companies started providing direct import of certain design formats, but without the export feature. Even then, with the increasing number of tool vendors and design formats, there is no single format that is supported by most of the EDA tools, and there is a need for improvement in this area. There has been some work reported on tool independent exchange of simulation models in but not on symbols and schematic. In a typical electronic design process, a designer uses a CAD tool to create a schematic, generate a netlist and run simulations. However this is a manual process and is not scalable. If a designer has to create 100 or 1000 schematics, that may have slight variations from each other, there is no automated method or tool available. One approach is to create a netlist from a schematic and then quickly create multiple netlists either manually or using some form of computer assisted manipulation. This approach will, after some extra effort, arrive at a set of netlists to allow a CAD tool to run simulations. However this approach has limitations. Though a generated netlist is fully functional (at least for simulations), it is not easy to visualize, probe, enhance and debug and therefore a schematic has to be created. In a typical application, an amplifier or a power model has to be created for 500+ devices which has typically been done using mostly manual netlist manipulation. However, a schematic is usually required for shipping a design to end customers. Further exacerbating the process, the generated netlists often encounter simulation issues such as non-convergence. Debugging such netlists (e.g., without a schematic) is a very tedious task. Another issue with prior art applications is that a schematic may be lost (e.g., not supported) due to an obsolete CAD system which is no longer supported to recreating that schematic in a different CAD system. That is, there is no common format to export from an old CAD system into a current CAD system. Thus, getting a design transferred from an obsolete (or outdated) CAD system to another may be problematic.

SUMMARY

In a first example, a computer system is disclosed. The computer system includes a memory; and a processing device communicatively coupled to the memory. The memory stores instructions that when executed by the processing device cause the processing device to: receive an indication to export information pertaining to a first electronic design from a first Electronic Design Automation (EDA) tool executing on the computer system, the indication to export comprising information to request export in a common file format; exporting information describing the first electronic design from the first EDA tool; and store the information in a first simulation exchange format (SEF) file describing the first electronic design based on the common file format, wherein the common file format includes information sufficient to recreate the placement and routing of components in the first electronic design.

In a second example, a computer system is disclosed. The computer system includes a memory; and a processing device communicatively coupled to the memory. The memory stores instructions that when executed by the processing device cause the processing device to: receive an indication to import, a simulation exchange format (SEF) file defining an electronic design, to a first Electronic Design Automation (EDA) tool executing on the computer system, the SEF file comprising information sufficient to recreate the placement and routing of components in the electronic design; process the SEF file to identify component objects and associate model names to the identified component objects; process the SEF file to map components to a symbol and obtain location, rotation, and mirroring information pertaining to the symbol; process the SEF file to place components and route wires between components based on at least one constraint; and present a schematic view of the electronic design in the first EDA tool.

In yet another example, a non-transitory computer readable medium is disclosed. The non-transitory computer readable medium has instructions stored thereon that when executed by a processing device cause the processing device to: receive an indication to export information pertaining to a first electronic design from a first Electronic Design Automation (EDA) tool executing on the computer system, the indication to export comprising information to request export in a common file format; exporting information describing the first electronic design from the first EDA tool; and store the information in a first simulation exchange format (SEF) file describing the first electronic design based on the common file format, wherein the common file format includes information sufficient to recreate the placement and routing of components in the first electronic design.

BRIEF DESCRIPTION OF THE DRAWINGS

For a detailed description of various examples, reference will now be made to the accompanying drawings in which:

FIG. 5 illustrates an XML file portion 500 representing components that may appear in an SEF file or in-built component template, according to one or more disclosed implementations;

DETAILED DESCRIPTION

In the following description, for purposes of explanation, numerous specific details are set forth in order to provide a thorough understanding of the examples disclosed herein. It will be apparent, however, to one skilled in the art that the disclosed example implementations may be practiced without these specific details. In other instances, structure and devices are shown in block diagram form in order to avoid obscuring the disclosed examples. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one example" or to "an example" means that a particular feature, structure, or characteristic described in connection with the examples is included in at least one implementation.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Examples may include non-volatile secondary storage, read-only memory (ROM), and/or random-access memory (RAM).

As used herein, the terms "application" and "function" refer to one or more computing modules, programs, processes, workloads, threads and/or a set of computing instructions executed by a computing system. Example implementations of applications and functions include software modules, software objects, software instances and/or other types of executable code. Note, the use of the term "application instance" when used in the context of cloud computing refers to an instance within the cloud infrastructure for executing applications (e.g., for a customer in that customer's isolated instance).

Figure 1:
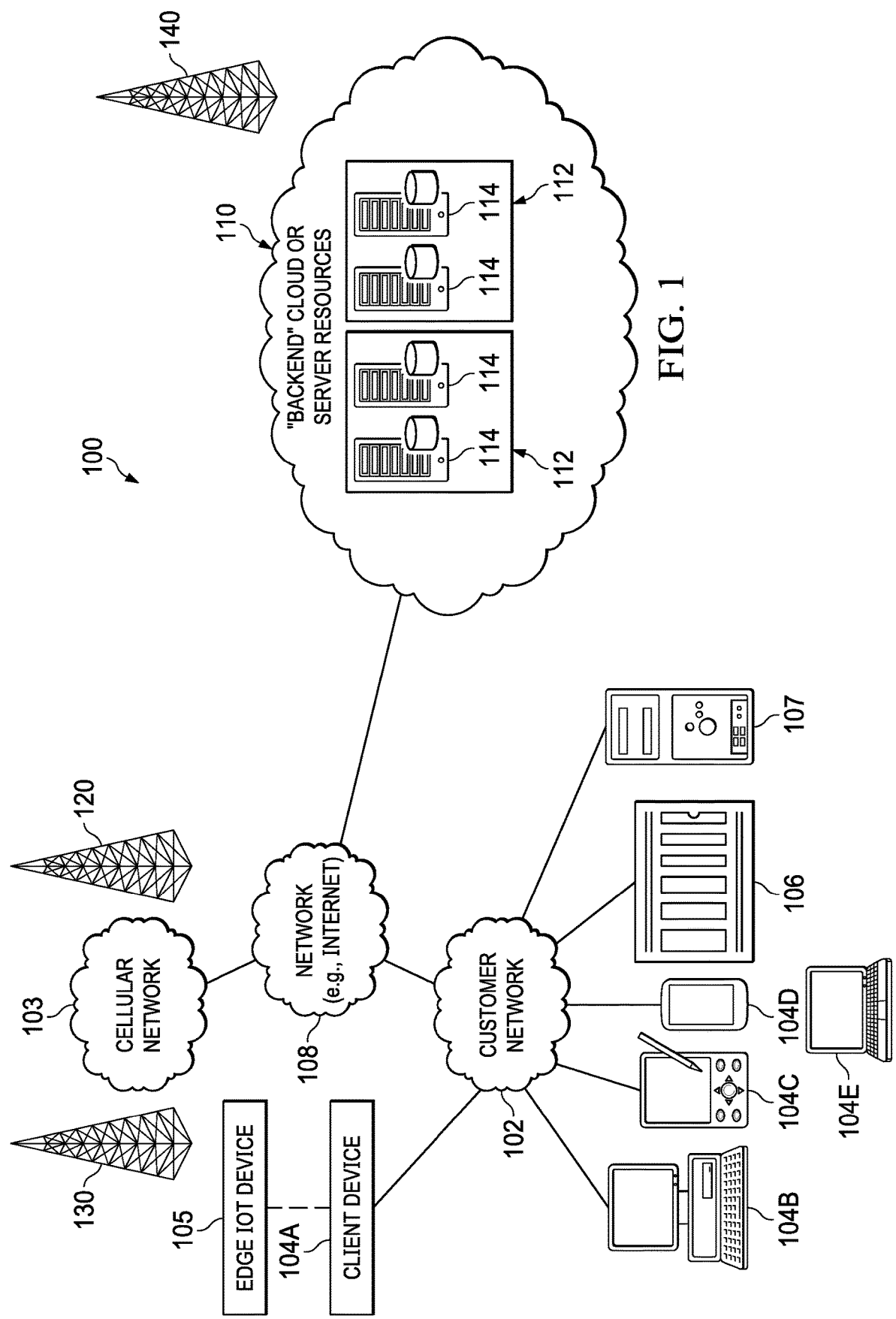
FIG. 1 illustrates a block diagram of an example of a networked computing infrastructure 100 where implementations of the present disclosure may operate.

FIG. 1 illustrates a block diagram of an example of a networked computing infrastructure 100 where implementations of the present disclosure may operate. Networked computing infrastructure 100 comprises a customer network 102, network 108, and a "backend" cloud or server resources platform/network 110. In one example, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi® networks, Bluetooth®). Wi-Fi is a registered trademark of the Wi-Fi Alliance. Bluetooth is a registered trademark of Bluetooth Special Interest Group. In another example, customer network 102 represents an enterprise network that could include or be communicatively coupled to one or more local area networks (LANs), virtual networks, data centers, and/or other remote networks (e.g., 108, 112). As shown in FIG. 1, customer network 102 may be connected to one or more client devices 104A-E and allow the client devices to communicate with each other and/or with backend cloud or server resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Networked computing infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG. 1 also illustrates that customer network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between customer network 102 and other networks such as network 108 and backend cloud or server resources platform/network 110. Local compute resource 106 may also facilitate communication between other external applications, data sources, and services, and customer network 102. FIG. 1 also illustrates that customer network 102 may be connected to a computer configured to execute a management, instrumentation, and discovery (MID) server 107. For example, MID server 107 may be a Java application that runs as a Windows service or UNIX daemon. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation.

Networked computing infrastructure 100 also includes cellular network 103 for use with mobile communication devices. Mobile cellular networks support mobile phones and many other types of mobile devices such as laptops etc. Mobile devices in networked computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices, such as wireless access points and routers (e.g., local compute resource 106). In addition, the mobile devices may interact with other mobile devices or with non-mobile devices such as desktop computer 104B and various types of client devices 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WANs), the Internet, and/or other remote networks, in order to transfer data between client devices 104A-E and backend cloud or server resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, backend cloud or server resources platform/network 110 is illustrated as a remote network (e.g., a cloud network) that is able to communicate with client devices 104A-E via customer network 102 and network 108. Backend cloud or server resources platform/network 110 acts as a platform that provides additional computing resources to the client devices 104A-E and/or customer network 102. For example, by utilizing backend cloud or server resources platform/network 110, users of client devices 104A-E may be able to build and execute applications, such as automated processes for various enterprise, IT, and/or other organization-related functions. In one example, backend cloud or server resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to, a web server instance (e.g., a unitary Apache installation), an application server instance (e.g., unitary Java Virtual Machine), and/or a database server instance (e.g., a unitary MySQL catalog).

To utilize computing resources within backend cloud or server resources platform/network 110, network operators may choose to configure data centers 112 using a variety of computing infrastructures. In one example, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another example, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access backend cloud or server resources platform/network 110, and customer-driven upgrade schedules.

Figure 2:
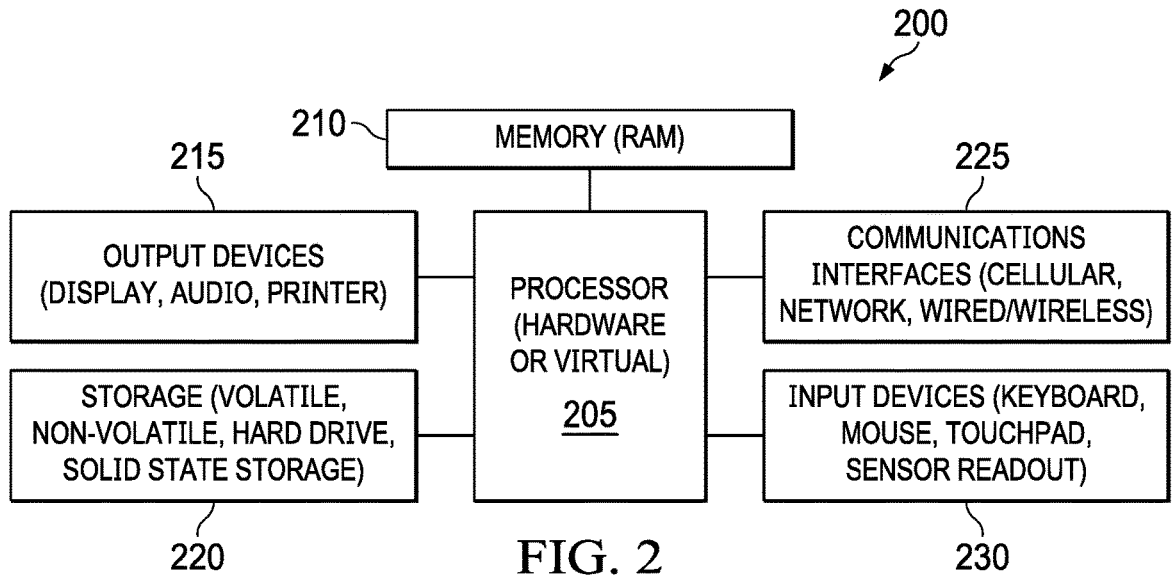
FIG. 2 illustrates a high-level block diagram 200 of a processing device (computing system) that may be used to configure one or more disclosed implementations.

FIG. 2 illustrates a high-level block diagram 200 of a processing device (computing system) that may be used to implement one or more disclosed examples (e.g., a service provider cloud infrastructure such as backend cloud or backend server resources 110, client devices 104A-104E, server instances 114, data centers 112, etc.). For example, computing device 200, illustrated in FIG. 2, could represent a client device or a physical server device and could include either hardware or virtual processor(s) depending on the level of abstraction of the computing device. In some instances (without abstraction) computing device 200 and its elements as shown in FIG. 2 each relate to physical hardware and in some instances one, more, or all of the elements could be implemented using emulators or virtual machines as levels of abstraction. In any case, no matter how many levels of abstraction away from the physical hardware, computing device 200 at its lowest level may be implemented on physical hardware. As also shown in FIG. 2, computing device 200 may include one or more input devices 230, such as a keyboard, mouse, touchpad, or sensor readout (e.g., biometric scanner) and one or more output devices 215, such as displays, speakers for audio, or printers. Some devices may be configured as input/output devices also (e.g., a network interface or touchscreen display). Computing device 200 may also include communications interfaces 225, such as a network communication unit that could include a wired communication component and/or a wireless communications component, which may be communicatively coupled to processor 205. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 2, processing device 200 includes a processing element, such as processor 205, that contains one or more hardware processors, where each hardware processor may have a single or multiple processor cores. In one example, the processor 205 may include at least one shared cache that stores data (e.g., computing instructions) that are utilized by one or more other components of processor 205. For example, the shared cache may be a locally cached data stored in a memory for faster access by components of the processing elements that make up processor 205. In some cases, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) microprocessor. Although not illustrated in FIG. 2, the processing elements that make up processor 205 may also include one or more other types of hardware processing components, such as graphics processing units (GPUs), application specific integrated circuits (ASICs), field-programmable gate arrays (FPGAs), and/or digital signal processors (DSPs).

FIG. 2 illustrates that memory 210 may be operatively and communicatively coupled to processor 205. Memory 210 may be a non-transitory medium configured to store various types of data. For example, memory 210 may include one or more storage devices 220 that comprise a non-volatile storage device and/or volatile memory. Volatile memory, such as random access memory (RAM), can be any suitable non-permanent storage device. The non-volatile storage devices 220 can include one or more disk drives, optical drives, solid-state drives (SSDs), tape drives, flash memory, read-only memory (ROM), and/or any other type memory designed to maintain data for a duration time after a power loss or shut down operation. In certain instances, the non-volatile storage devices 220 may be used to store overflow data if allocated RAM is not large enough to hold all working data. The non-volatile storage devices 220 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 205. In one instance, the compiling process of the software program may transform program code written in a programming language to another computer language such that the processor 205 is able to execute the programming code. For example, the compiling process of the software program may generate an executable program that provides encoded instructions (e.g., machine code instructions) for processor 205 to accomplish specific, non-generic, particular computing functions.

After the compiling process, the encoded instructions may then be loaded as computer executable instructions or process steps to processor 205 from storage 220, from memory 210, and/or embedded within processor 205 (e.g., via a cache or on-board ROM). Processor 205 may be configured to execute the stored instructions or process steps in order to perform instructions or process steps to transform the computing device into a non-generic, particular, specially programmed machine or apparatus. Stored data, e.g., data stored by a storage device 220, may be accessed by processor 205 during the execution of computer executable instructions or process steps to instruct one or more components within the computing device 200.

A user interface (e.g., output devices 215 and input devices 230) can include a display, positional input device (such as a mouse, touchpad, touchscreen, or the like), keyboard, or other forms of user input and output devices. The user interface components may be communicatively coupled to processor 205. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 200 may comprise other components well known in the art, such as sensors, powers sources, and/or analog-to-digital converters, not explicitly shown in FIG. 2.

In this disclosure, a method and system to generate a schematic in both online and offline CAD tools from a text based netlist are explained. In one example implementation, a netlist will first be parsed and components found in the netlist will be both a) identified and b) mapped to components in target CAD tools using disclosed techniques based on device models. A text based file format, in the disclosed examples based on Extensible Markup Language (XML), may be used to provide a common file format (and transfer means) across a multitude of CAD tools.

In a first example, custom components that are part of a design may be created and information about them stored in the common file format as well. A novel in-built library of pattern of components may be identified as a group and placed together in intuitive way in a schematic. Next, the rest of the components may be automatically placed based on an algorithm which will provide a user better readability. Finally, a complete schematic may be connected based in part on information defined in a netlist. During schematic generation, all models may be mapped one-on-one and attached to components. The simulation settings may be added, including probes etc. The final schematic is then ready for simulation. A preprocessing step may be included to simplify the netlist as an option. This approach can support both online and offline CAD tools for schematic generation/simulation. The generated schematic, using the methods of this disclosure, may be very close to a hand drawn schematic with high readability compared to other fully automated placements/routing which have results that are hard to understand and debug. In the disclosed solution, there is no requirement for an Application Programming Interface (API) from the CAD tool to create the schematic. If an API is available, the disclosed common file format may be converted (e.g., as part of an importing step) to use the available API. The techniques of this disclosure are therefore capable of working with most CAD tools. Template driven placement and routing is provided to improve a user's experience. Most of the existing solutions provide a way to create the artwork (with primitive symbols) without the routing or simulation settings. In the disclosed example implementations not only are the primitives placed but custom symbols are created as well and attached to models, simulation settings are added, and the routing is completed. A template may be used for component placements as well as routing. Templates may be made available in an in-built library. Additionally user provided templates, if any, may be incorporated into the process. One goal is to create accurate and Reliable UI automation for multiple CAD tools schematic creation/automation even when those CAD tools lack an import/export API.

Figure 3:
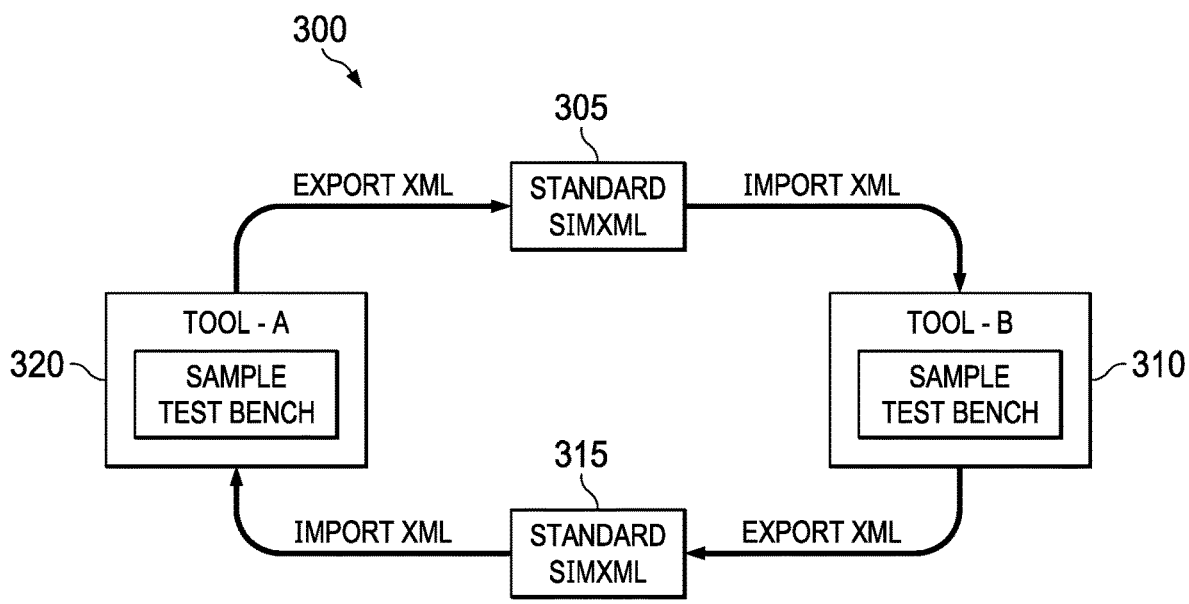
FIG. 3 illustrates a flow diagram 300 illustrating a method of exchanging designs between one or more, possibly different, design tools, according to one or more disclosed implementations.

Referring now to FIG. 3, flow 300 illustrates one possible method for transferring files using the disclosed common file format. This format includes all the required information to recreate a schematic design in a test bench. In addition, it allows flexibility to include information that is specific to certain EDA tools. One objective of defining a common file format is to minimize the users' efforts in translating power designs between platforms, as may be required for their system integration flow. In this example, the file format used for the standardization is Extensible Markup Language (XML), and the exchange format is named Simulation Exchange Format (SEF). The application of this standard is demonstrated in the WEBENCH® simulation export capability, where the power designs created by the user in tool-A 320 (e.g., WEBENCH) may be exported to a standard simulator XML 305 and imported into a different tool-B 310, possibly from a different vendor. (WEBENCH is a registered trademark of Texas Instruments Incorporated). Altium Designer and OrCAD capture represent just two of several industry available design solutions for schematic designs that may benefit from the common file format transfer mechanism of this disclosure. (Altium is a registered trademark of Altium LLC. and OrCAD is a registered trademark of Cadence Design systems, Inc.). Of course, the transfer could also happen in the other direction as shown at 315. WEBENCH may include the capability to export a given set of test benches to the standard SEF file disclosed. The SEF designs may be imported to CAD tools like TINA-TI™, OrCAD Capture CIS, Altium Designer etc., using custom built software extensions. (TINA-TI is a trademark of Texas Instruments Incorporated). As an extension to this example, the design exchange between any Printed Circuit Boards (PCB) Design Tools to Integrated Circuit (IC) Design tools and vice-versa may be implemented.

EDA tool vendors have their own way of designing and grouping information in their tool (i.e., a proprietary format), leading to the format of storing the design information proprietary to the vendors. At times it is difficult to take the complete design data from one tool to other as required by the user workflow. Simulation Exchange Format as disclosed herein addresses this issue by, at least in part, storing the design information in an open format. SEF promotes open standard and intends to ease of interoperability within design tools. This format encompasses all the information required for 1) generating a visual representation of schematic, 2) generating a netlist, and 3) generating instructions to the simulator to run simulations. SEF enables translation of multiple test benches of a circuit through a single file. For example, a buck converter test setup may include test benches like average, steady state, transients, etc., that are usually grouped under a single project. SEF enables representation of a complete project in a single file making the translation process easier.

Figure 4:
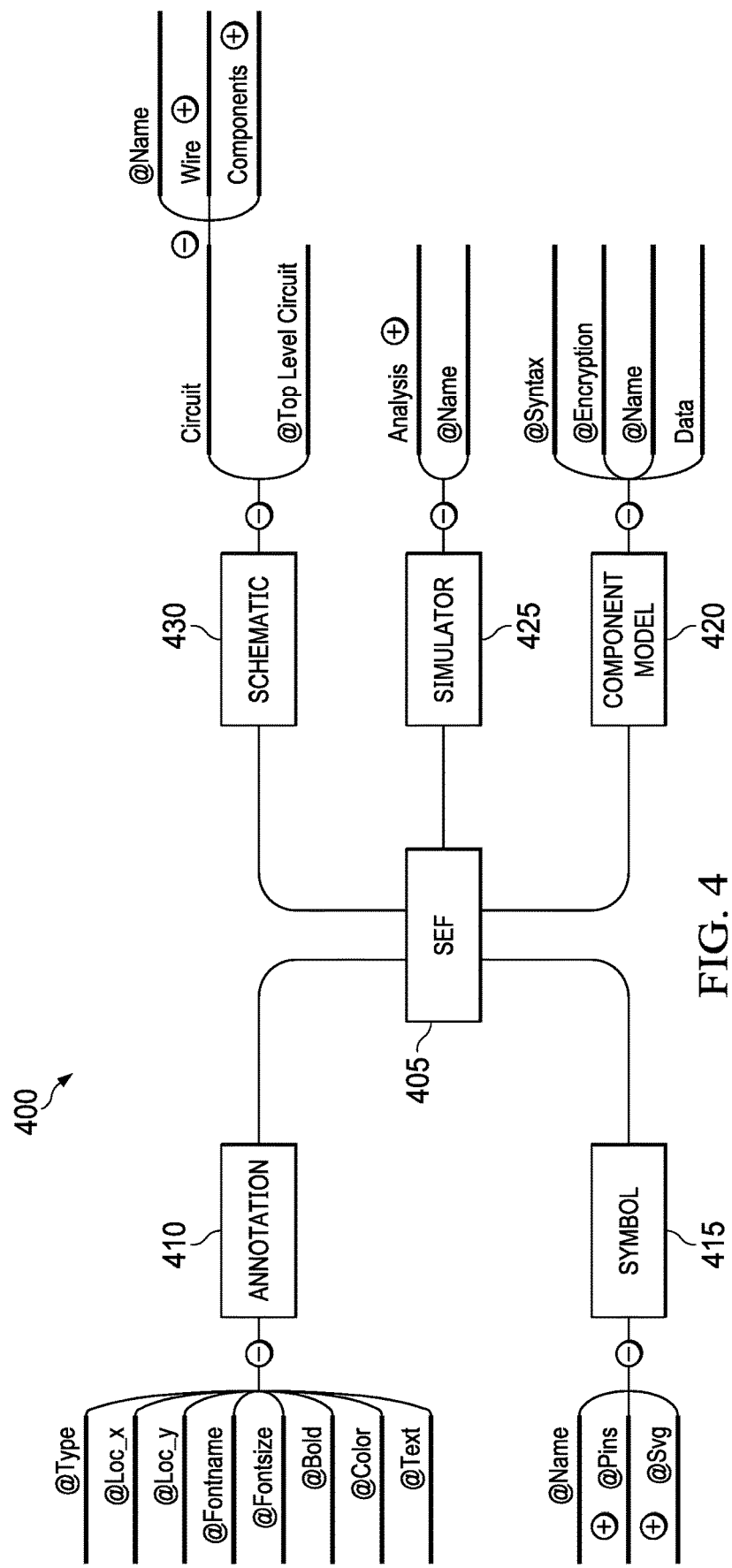
FIG. 4 illustrates a diagram 400 depicting details of a Simulation Exchange Format (SEF), according to one or more disclosed implementations.

The following section provides an overview of requirements of SEF and leads to a discussion of SEF components as illustrated in FIG. 4. Representing a set of test benches in a single file imposes following criteria on the selection of the data format.

1) Support for hierarchical data representation;
2) Easily extensible, open format, human-readable; and
3) Readily available APIs in programming languages for parsing and composing the file.

XML format complies with above mentioned criteria. The next step is to identify the elements of the design and appropriately categorize the related data. The elements are wires, components, symbols, pins, etc. The information that defines these elements can be categorized as follows:

1) Mandatory data: The bare essentials for a given element, without which the element is incomplete, and the particular chunk of data become useless (e.g., a pin of a component). The pin name, pin number and pin locations are bare minimum requirements for any tool to understand and replicate the pin in the design. Without any of these, the pin cannot be placed in the schematic, making the pin information standing alone useless.

2) Optional data: The information that is not essential for the correct regeneration of the schematic in electrical behavior, but which adds to better user experience, are categorized under optional data (e.g., information on whether or not a pin name has to be displayed in the schematic). Similarly, the color of pin display, location of the pin name display, etc. may also be considered optional data.

3) Tool specific data: Certain data related to the design may make sense only in a specific CAD tool. For other platforms it can simply be ignored. For example, Boolean flags like is ignore_open, is_digital, is_long, etc.

Before the discussion of elements in a standard SEF file, certain basic criteria are set up, that help maintain the uniformity, and ease the process of design export and import.

1) Hierarchical representation: Most of the designs have many components that are repeatedly used. For example, a diode D from manufacturer X, being used three times as D1, D2, and D3, respectively. The symbol information for these three diodes remains the same, and so do their behavioral models. In such scenarios, one way to store the data would be to have all the symbols defined in a single place, which can be referred to by any component instances. This may reduce the file size and may also reduce the probability of error.

2) Symbol graphics: For easier read, write, and processing of symbol information, a well-established standard Scalable Vector Graphics (SVG) may be used to represent any graphical data. Many EDA products are already compatible with this format. Also, SVG processing libraries are available in many programming languages, making it easier for writing any desired APIs to export or import the SEF.

3) Co-ordinate axes definitions: The direction of x and y axes vary across the different vendor tools. Usually x is positive from left to right in most of the tools. Y is positive from top to down in some tools where as it is positive from down to top in others. In order to maintain a standard, in this example, y is set to positive in upward direction. The co-ordinates of objects need to be transformed from vendor specific co-ordinate system to the SEF standard while writing to SEF file.

4) Grid adjustments: Grid spacing is the distance between two adjacent points in the design workspace or the design sheet, which can be assigned as the value for any co-ordinate location based property of any element in the design. In other words, any measurable coordinate value is a multiple of grid. Any element placed on a location apart from the multiples of the grid spacing is termed off-grid. Off-grid elements can impact well-functioning of the circuit in the CAD tool. With off-grid elements in the design, features like Design Rule Check, Netlisting, etc. might tend to malfunction. Every CAD tool has its own grid spacing value, and in order to adhere to it during design exchange process, it is desirable for the translation program to have the information of the grid settings of the other tool. In order to eliminate this dependency, a fixed grid spacing of 10 is used in the standard common file format. However, flexible grid spacing is allowed provided the appropriate value is specified in the SEF file.

Referring to FIG. 4, diagram 400 illustrates the details of all the elements in a standard SEF 405, which may be grouped in hierarchical fashion. Schematic 430: This section includes information used to draw and display the schematic in any tool. All the information is grouped under circuit block. A design may contain multiple hierarchical circuit blocks, or just a top-level block. A circuit block in turn contains components, wires and annotations. These components may either be circuit block referrers or leaf level components. A circuit block referrer is the one which invokes another circuit block as its description. In such case, the child circuit block contains the information of components and wires. This can be recursive up to many levels, at the end of which only leaf-elements are defined. A leaf element is the one which is self-sufficient and does not need more information to make itself a useful section of a circuit. Component Models 420: This section includes the models used by the simulator to simulate the design. Models identified by their name are listed under this group. The model may include a name, model syntax information, and other relevant data. A given component can have models defined in various SPICE syntaxes, for instance a diode can have default UC Berkeley SPICE3 model. Additionally a piece wise linear or a lookup-table model for the same diode might be available. In such cases a tool-specific element is added as sub-section under the same model description, and the respective tools can pick the applicable data. Simulation Setup 425: The setup required by the simulator to analyze the design. Information like the type of analysis, the simulation parameters, the probe data selection, etc. is grouped under this section. One can specify multiple simulation setups in a single SEF. Symbol information 415: This section includes the name and other attributes of symbols shown in the schematic defined by a single SEF. Annotation information 410: This section includes attributes (e.g., font, font size, color) of annotations that may be found in a schematic defined by a single SEF.

Referring now to FIG. 5, example XML file portion 500 illustrates how elements may be represented within an example portion of an XML file. File portion 500 represents an XML file with several example elements of a definition of a Schematic which may appear in an SEF file or be represented by an in-built component template. A component definition is shown at element 510. Several parameter definitions are shown at 515, 516 and 517. Detail tolerance parameters are shown at element 520. Image information is shown at element 525.

Figure 6:
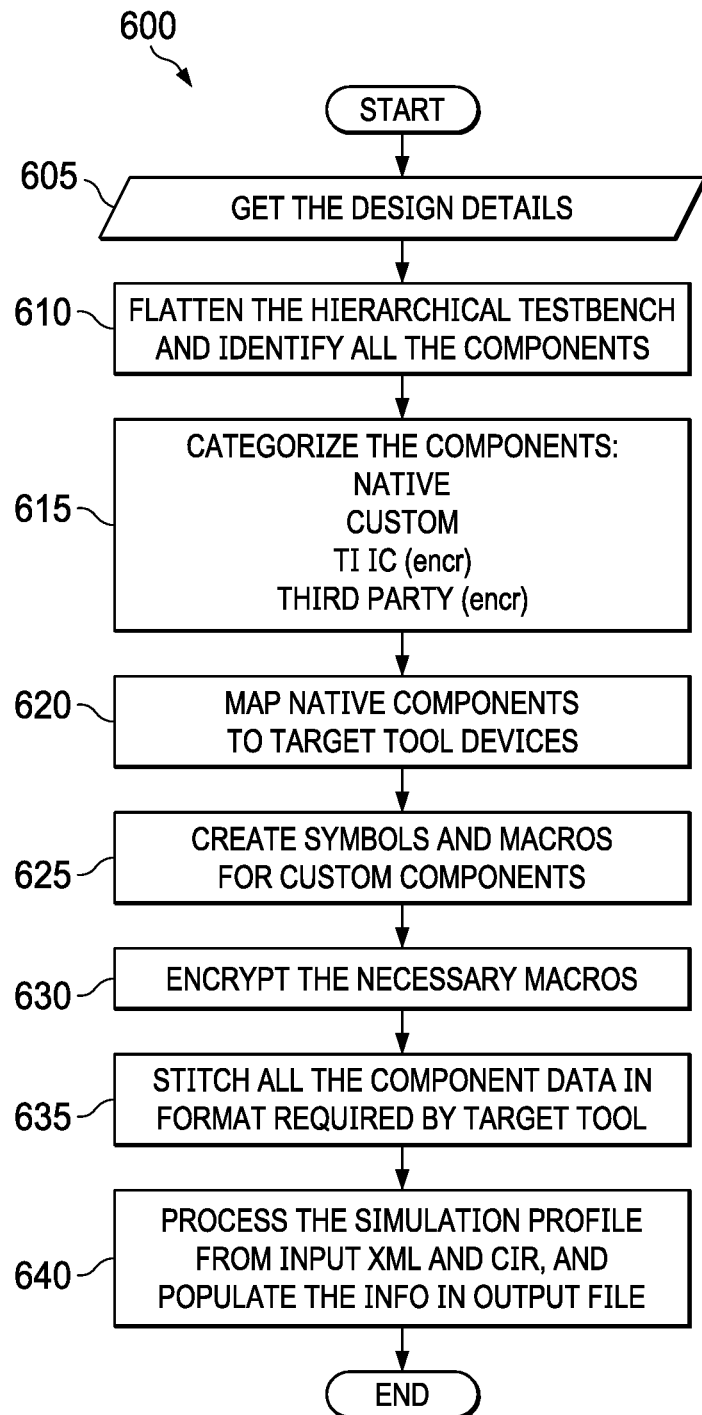
FIG. 6 illustrates flow chart 600 for one possible method for exporting an SEF definition file from a design tool, according to one or more disclosed implementations.

Referring now to FIG. 6, flow chart 600 illustrates some example steps that may be included in a process to generate an SEF file from a given design tool. While the EDA tools have different methods of maintaining their information internally, the basic elements essential for building an SEF may be extractable. In general, the exporter may collect the data for components, wire, probes, and simulation setup, and write to the SEF. In addition, header information may be written to the file to allow an importer to setup the context of design. Beginning at block 605, design details from a schematic may be obtained. At block 610, the hierarchical testbench may be flattened and components identified. At block 615, each component may be categorized and sensitive information may be encrypted. Block 620 indicates that native components may be mapped to target tool devices. At block 625, symbols and macros for custom components may be created. The macros may be encrypted at block 630. Block 635 indicates that the component data may be stitched together for use by a target tool. Finally at block 640, the simulation profile from an input xml and circuit may be used to populate information in the output SEF file.

Figure 7:
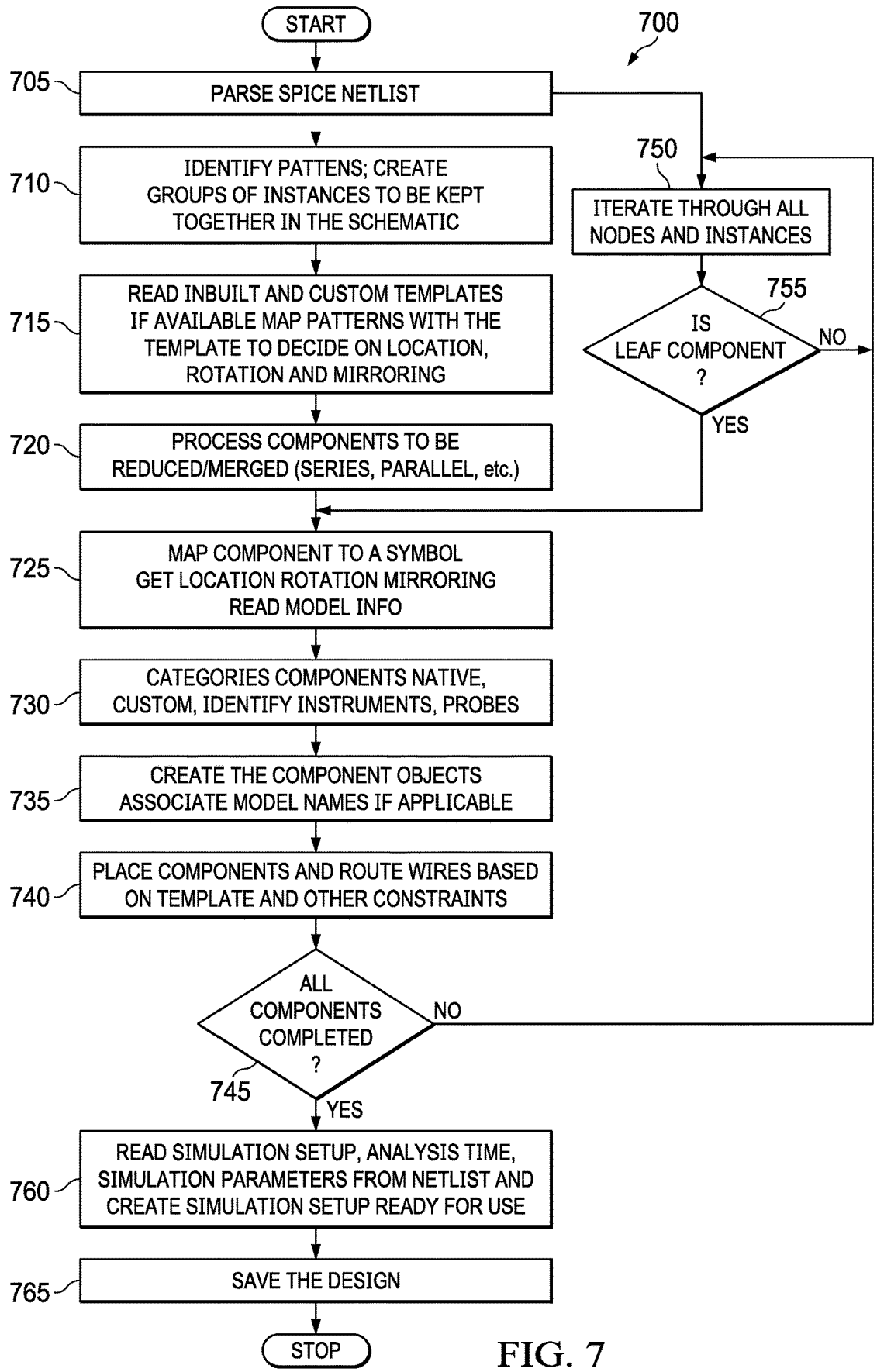
FIG. 7 illustrates flow chart 700 for one possible method for creating an SEF definition file from a netlist definition file, according to one or more disclosed implementations.

Referring now to FIG. 7, flow chart 700 illustrates one possible method for generating an SEF file from a Netlist file. Beginning at block 705, the netlist file may be parsed to identify pertinent information. Exiting block 705, two parallel flows may be initiated (parallel flows may also be performed serially). A first to perform an iterative loop starting at block 750 (discussed further below) and a second to identify patterns and create groups of instances to be kept together in the schematic (block 710). At block 715, in-built and custom templates (if available) may be used to map patterns with the template to determine location, rotation, and mirroring. Block 720 indicates that some components may be reduced or merged because they are identified as in series or parallel for example. Flow continues to block 725 to map each component to a symbol and determine location, rotation, and mirroring. Block 730 indicates that components may be categorized. At block 735, component objects may be created and associated with model names if applicable. Block 740 indicates that components may be placed and wires routed based on a template or other constraints. Decision 745 determines if all components are completed. If so, the YES prong of decision 745, flow continues to blocks 760 where simulation information from the netlist may be used to define a simulation setup and to block 765 where the design may be saved. Alternatively, if not all components are completed, the NO prong of decision 745, flow loops to block 750 for iteration through all nodes and instances in the netlist. Decision 755 skips over any components that are not leaf components and processes any remaining leaf components by returning flow to block 725.

Additional examples of netlists, corresponding schematics, and common file formats are available in U.S. Provisional Patent Application Ser. No. 62/566,336, filed 30 Sep. 2017, and 62/611,958, filed 29 Dec. 2017 both of which are incorporated herein by reference in their entirety for all applicable purposes.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

At least one example implementation is disclosed and variations, combinations, and/or modifications of the example(s) and/or features of the example(s) made by a person having ordinary skill in the art are within the scope of the disclosure. Alternative implementations that result from combining, integrating, and/or omitting features of the example(s) are also within the scope of the disclosure. The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A computer system, comprising:
a memory; and
a processing device communicatively coupled to the memory, wherein the memory stores instructions that when executed by the processing device cause the processing device to:
receive an indication to export information pertaining to a first electronic design from a first Electronic Design Automation (EDA) tool executing on the computer system, the indication to export comprising information to request export in a common file format, the common file format comprising a human readable text based common file format;
export information describing the first electronic design from the first EDA tool; and
store the export information in a first simulation exchange format (SEF) file describing the first electronic design in the common file format, wherein the common file format in the SEF file includes information sufficient to recreate the placement and routing of components in the first electronic design, the information in the SEF file comprising: a schematic element including a hierarchical description of at least one circuit block and leaf elements of the at least one circuit block, the leaf elements comprising circuit components in the schematic; a component model element including at least one model for the circuit components in the schematic description for use in simulations; a simulation setup element including information used to set up simulations of the components in the schematic; and a symbol information component including graphical information used to display symbols corresponding to circuit blocks and components in the schematic.

2. The computer system of claim 1, wherein the SEF file in the common file format further includes sufficient information to perform at least one simulation of the first electronic design.

3. The computer system of claim 1, wherein common file format is stored in XML.

4. The computer system of claim 1, wherein exporting information describing the first electronic design from the first EDA tool is performed by interfacing with an Application Program Interface of the first EDA tool.

5. The computer system of claim 1, wherein exporting information describing the first electronic design from the first EDA tool is performed natively by the first EDA tool.

6. The computer system of claim 1, wherein the instructions further cause the processing device to generate a plurality of related SEF files based on the stored SEF file.

7. The computer system of claim 1, wherein a template is used for at least one component placement.

8. The computer system of claim 1, wherein the instructions further cause the processing device to:
receive an indication to import, a second simulation exchange format (SEF) file defining a second electronic design, to the first Electronic Design Automation (EDA) tool, the second SEF file comprising information sufficient to recreate the placement and routing of components in the second electronic design;
process the second SEF file to identify component objects and associate model names to the identified component objects;
process the second SEF file to map components to a symbol and obtain location, rotation, and mirroring information pertaining to the symbol;
process the second SEF file to place components and route wires between components based on at least one constraint; and
present a schematic view of the second electronic design in the first EDA tool.

9. The computer system of claim 1, wherein the instructions further cause the processing device to:
receive an indication to import, the first simulation exchange format (SEF) file defining the first electronic design, to a second Electronic Design Automation (EDA) tool executing on the computer system, the second SEF file comprising information sufficient to recreate the placement and routing of components in the first electronic design;
process the first SEF file to identify component objects and associate model names to the identified component objects;
process the first SEF file to map components to a symbol and obtain location, rotation, and mirroring information pertaining to the symbol;
process the first SEF file to place components and route wires between components based on at least one constraint; and
present a schematic view of the first electronic design in the second EDA tool.

10. The computer system of claim 9, wherein at least a portion of the information pertaining to the second electronic design is decrypted from the first SEF file.

11. The computer system of claim 1, wherein at least a portion of the information pertaining to the first electronic design is encrypted prior to storing in the first SEF file.

12. A computer system, comprising:
a memory; and
a processing device communicatively coupled to the memory, wherein the memory stores instructions that when executed by the processing device cause the processing device to:
receive an indication to import, a simulation exchange format (SEF) file defining an electronic design in a human readable text based common file format, to a first Electronic Design Automation (EDA) tool executing on the computer system, the SEF file comprising information sufficient to recreate the placement and routing of components in the electronic design, the information in the SEF file comprising: a schematic element including a hierarchical description of at least one circuit block and leaf elements of the at least one circuit block, the leaf elements comprising circuit components in the schematic; a component model element including at least one model for the circuit components in the schematic description for use in simulations; a simulation setup element including information used to set up simulations of the components in the schematic; and a symbol information component including graphical information used to display symbols corresponding to circuit blocks and components in the schematic;
process the SEF file to identify component objects and associate model names to the identified component objects;

process the SEF file to map components to a symbol and obtain location, rotation, and mirroring information pertaining to the symbol;

process the SEF file to place components and route wires between components based on at least one constraint; and present a schematic view of the electronic design in the first EDA tool.

13. The computer system of claim 12, wherein the instructions further cause the processing device to process the SEF file to identify simulation information for the electronic design.

14. The computer system of claim 13, wherein the instructions further cause the processing device to:

receive an indication to initiate a simulation on the electronic design; and provide simulation results based, in part, on simulation settings obtained from the SEF file.

15. A non-transitory computer readable medium comprising instructions stored thereon that when executed by a processing device cause the processing device to:

receive an indication to export information pertaining to a first electronic design from a first Electronic Design Automation (EDA) tool executing on the computer system, the indication to export comprising information to request export in a human readable text based common file format;

exporting information describing the first electronic design from the first EDA tool; and store the information in a first simulation exchange format (SEF) file describing the first electronic design in the common file format, wherein the SEF file in the common file format includes information sufficient to recreate the placement and routing of components in the first electronic design, the information in the SEF file comprising: a schematic element including a hierarchical description of at least one circuit block and leaf elements of the at least one circuit block, the leaf elements comprising circuit components in the schematic; a component model element including at least one model for the circuit components in the schematic description for use in simulations; a simulation setup element including information used to set up simulations of the components in the schematic; and a symbol information component including graphical information used to display symbols corresponding to circuit blocks and components in the schematic.

16. The non-transitory computer readable medium of claim 15, wherein the SEF file in the common file format further includes sufficient information to perform at least one simulation of the first electronic design.

17. The non-transitory computer readable medium of claim 15, wherein common file format is stored in XML.

18. The non-transitory computer readable medium of claim 16, further comprising instructions to cause the processing device to:

receive an indication to import, a second simulation exchange format (SEF) file defining a second electronic design, to the first Electronic Design Automation (EDA) tool, the second SEF file comprising information sufficient to recreate the placement and routing of components in the second electronic design;

process the second SEF file to identify component objects and associate model names to the identified component objects;

process the second SEF file to map components to a symbol and obtain location, rotation, and mirroring information pertaining to the symbol;

process the second SEF file to place components and route wires between components based on at least one constraint; and present a schematic view of the second electronic design in the first EDA tool.

19. The non-transitory computer readable medium of claim 18, further comprising instructions to cause the processing device to:

receive an indication to import, the first simulation exchange format (SEF) file defining the first electronic design, to a second Electronic Design Automation (EDA) tool executing on the computer system;

process the first SEF file to identify component objects and associate model names to the identified component objects;

process the first SEF file to map components to a symbol and obtain location, rotation, and mirroring information pertaining to the symbol;

process the first SEF file to place components and route wires between components based on at least one constraint; and present a schematic view of the first electronic design in the second EDA tool.

20. The non-transitory computer readable medium of claim 19, wherein at least a portion of the information pertaining to the second electronic design is decrypted from the first SEF file.

* * * * *